(12) United States Patent
Sugimura et al.

(10) Patent No.: US 7,780,226 B2
(45) Date of Patent: Aug. 24, 2010

(54) VEHICULAR ROOF STRUCTURE

(75) Inventors: Takuya Sugimura, Saitama (JP); Nobuo Hosaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/381,351

(22) Filed: Mar. 11, 2009

(65) Prior Publication Data

US 2009/0230733 A1   Sep. 17, 2009

(30) Foreign Application Priority Data

Mar. 12, 2008   (JP) .............................. 2008-063172

(51) Int. Cl.
*B60J 7/00*   (2006.01)
(52) U.S. Cl. ............................................... 296/216.07
(58) Field of Classification Search ................................ 296/216.06–216.08
See application file for complete search history.

(56) References Cited

U.S. PATENT DOCUMENTS 4,328,990 A * 5/1982 Yoshida ...................... 296/222
5,154,481 A * 10/1992 Paetz et al. .................. 296/211

FOREIGN PATENT DOCUMENTS

JP   06-000855   1/1994

* cited by examiner

*Primary Examiner*—Dennis H Pedder
(74) *Attorney, Agent, or Firm*—Carrier, Blackman & Associates, P.C.; Joseph P. Carrier; William D. Blackman

(57) ABSTRACT

In a vehicular roof structure, a roof panel has a downwardly-bent roof panel flange formed on an inner edge portion thereof around the peripheral edge of a sunroof opening. Stiffener is disposed inwardly of the roof panel and having a stiffener flange that is welded to the reverse surface of the downwardly-bent roof panel flange at its portions corresponding to the corner portions. At the portions corresponding to the corner portions, the stiffener has a projecting portion projecting upward from the stiffener flange into abutment against the reverse surface of the roof panel in such a manner that a gap is formed between the reverse surface of the roof panel and a region of the stiffener around the projecting portion, and an adhesive is filled in the gap to fixedly adhere together the roof panel and the stiffener.

5 Claims, 5 Drawing Sheets

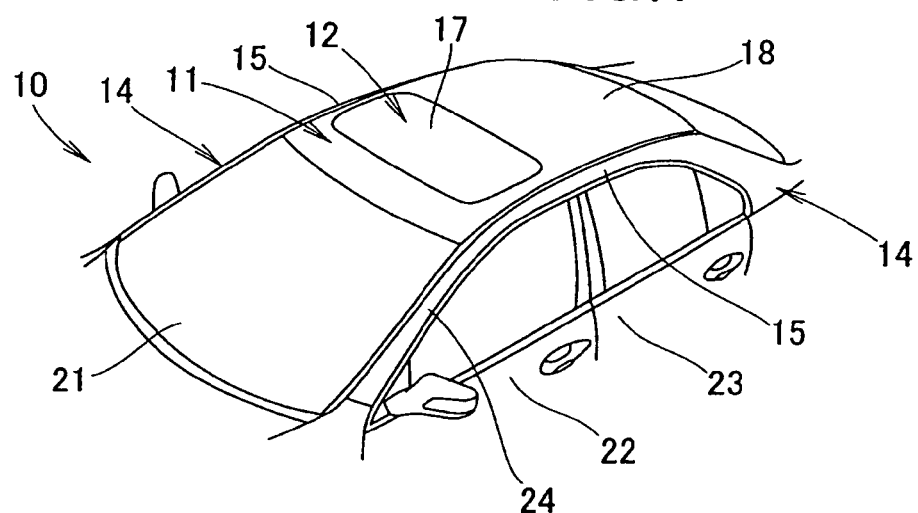
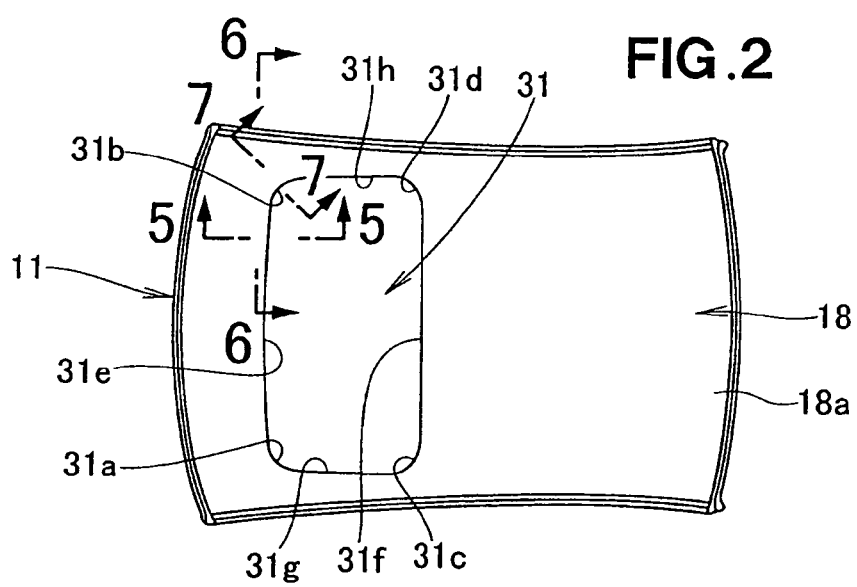
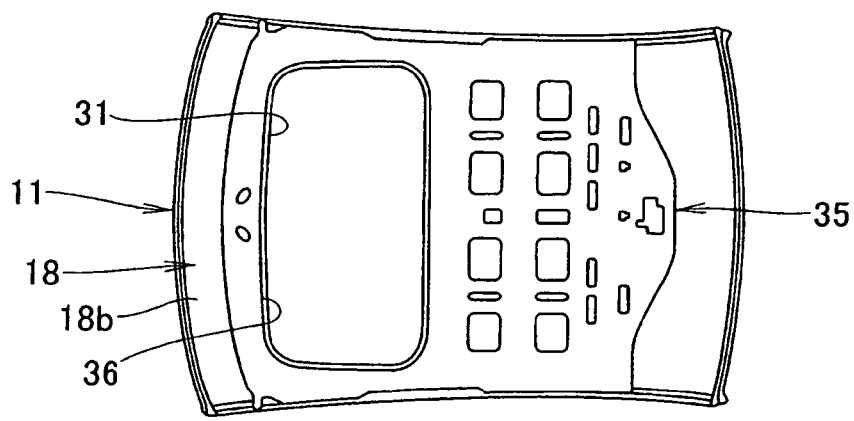

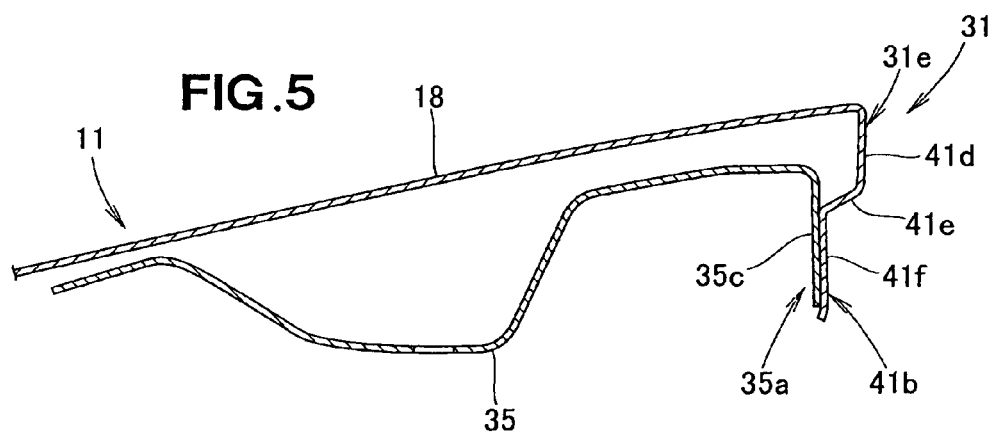
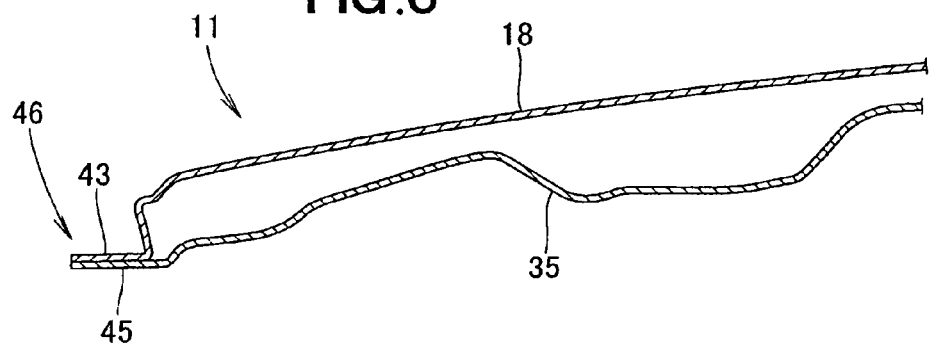
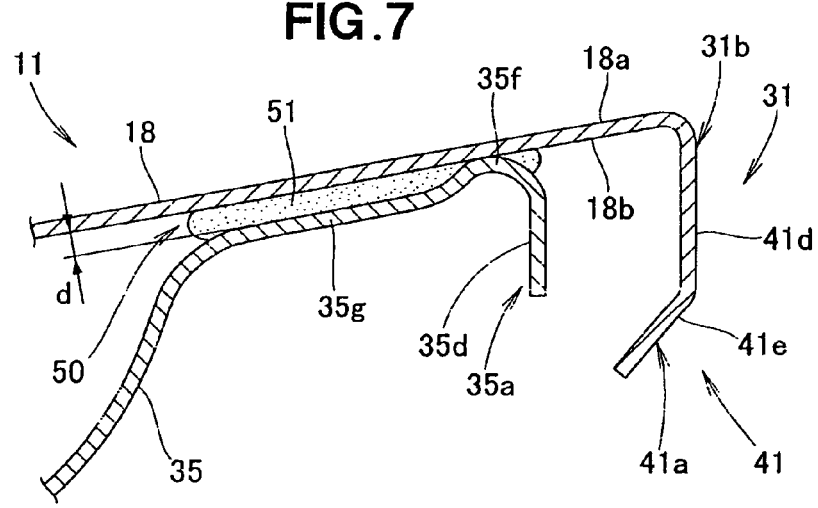

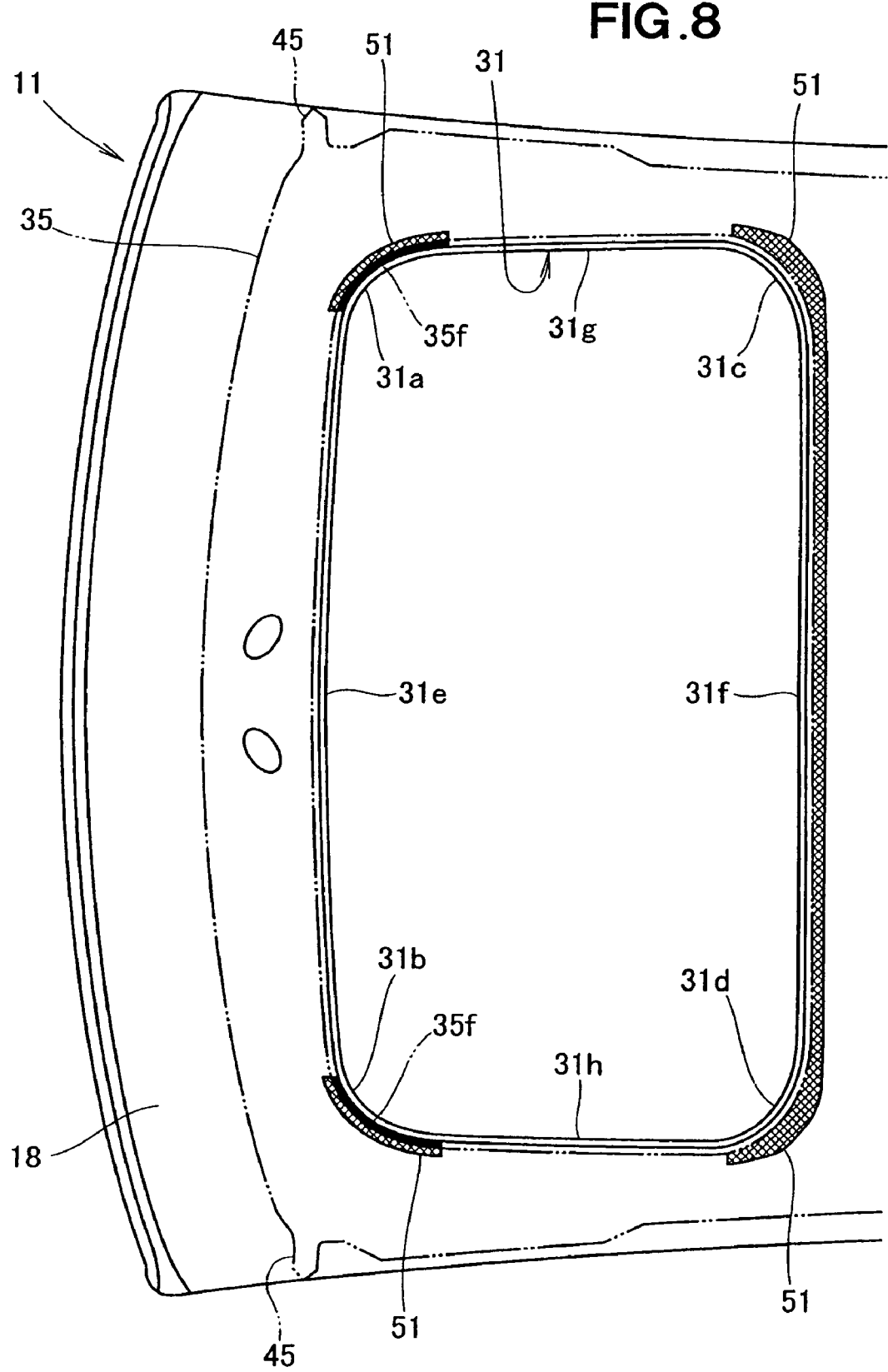

VEHICULAR ROOF STRUCTURE

FIELD OF THE INVENTION

This invention relates to an improvement over conventionally-known vehicular roof structures.

BACKGROUND OF THE INVENTION

In some of the conventionally-known vehicular roof structures provided with a sunroof, a roof panel, having a sunroof opening formed therein, has inner edge portions formed in a closed section so as to increase the strength of the peripheral edge of the opening. One example of such vehicular roof structures is disclosed in Japanese Utility Model Application Laid-Open Publication No. HEI-6-855.

FIG. 9 hereof is a sectional view showing the vehicular roof structure disclosed in the above-mentioned HEI-6-855 publication. According to the disclosure in the publication, inner edge portions of a roof panel 102, opposed to each other in a width direction of the vehicle and defining the peripheral edge of an opening 101 of a sunroof 100, are each bent downward to form a downward bent portion 103 facing the sunroof opening 101, and a flexing plate 106 spans between and fixed to the downward bent portion 103 and a corresponding rail (track member) 104 provided adjacent to the outer side edge of the roof panel 102 so that a closed section 107 is formed by the roof panel 102 and the flexing plate 106.

However, although the provision of the flexing plate 106 can increase the strength and rigidity of the peripheral edge of the sunroof opening 101, it would require an increased number of necessary component parts and increased cost. Further, because each of the bent portions 103 of the roof panel 102 has a downwardly bent cross section and a relatively great height (i.e., vertical width), press-forming corner portions of the opening 101 (i.e, corner portions of the inner edge portions of the roof panel 102) tends to be very difficult. Besides, because the above-mentioned bent portion 103 is not formed at the corner portions, the corner portions would have low strength and rigidity. Further, in order to achieve enhanced product quality, there is another need to reinforce the peripheral edge of the sunroof opening without adversely influencing the outer appearance of the roof panel 102.

SUMMARY OF THE INVENTION

In view of the foregoing prior art problems, it is an object of the present invention to provide an improved vehicular roof structure which can increase strength and rigidity of the peripheral edge of a sunroof opening while still retaining a good outer appearance and without requiring extra component parts.

In order to accomplish the above-mentioned object, the present invention provides an improved vehicular roof structure, which comprises: a roof panel having an opening formed therein for mounting therein a sunroof, the roof panel having a downwardly-bent roof panel flange formed on inner edge portions thereof around (or defining) a peripheral edge of the opening; and a stiffener disposed inwardly of the roof panel and having a stiffener flange welded to the reverse surface of the downwardly-bent roof panel flange except at portions thereof corresponding to corner portions of the peripheral edge of the opening. At each of the portions corresponding to the corner portions of the peripheral edge of the opening, the stiffener has an upwardly-oriented projecting portion projecting upward from the stiffener flange into abutment against the reverse surface of the roof panel in such a manner that a predetermined gap is formed between the reverse surface of the roof panel and a region of the stiffener around the projecting portion, and an adhesive is inserted into the gap to fixedly adhere together the roof panel and the stiffener.

At each of the other portions than the corner portions, the peripheral edge of the opening can be reinforced by the downwardly-bent roof panel flange of the roof panel and the stiffener flange welded together. Each of the corner portions of the peripheral edge of the opening, on the other hand, can be reinforced not only by the projecting portion, having high rigidity, of the stiffener being abutted against the reverse surface of the roof panel, but also by the reverse surface of the roof panel and the region of the stiffener around the projecting portion being adhered together by the adhesive. As a result, the present invention can significantly increase the strength and rigidity of the peripheral edge of the opening including the corner portions.

Because it is only necessary to form the projecting portion on the stiffener and adhere the stiffener to the reverse surface of the roof panel, there is no need to provide any additional component part for reinforcing the corner portions of the peripheral edge of the opening.

Although the adhesive contracts due as it cures, the high rigidity of the projecting portions can prevent the outer surface of the roof panel from being pulled inward to form a depression, so that the outer appearance of the rood will never be impaired.

The following will describe embodiments of the present invention, but it should be appreciated that the present invention is not limited to the described embodiments and various modifications of the invention are possible without departing from the basic principles. The scope of the present invention is therefore to be determined solely by the appended claims.

Preferably, the projecting portions are provided on those portions of the stiffener which correspond to the corner portions of the opening peripheral edge located closely to front pillars of the vehicle.

Desirably, the projecting portions are provided in a vicinity of the roof panel flange.

In a preferred form, the projecting portions are formed together with the stiffener flange.

BRIEF DESCRIPTION OF THE DRAWINGS

Preferred embodiments of the present invention will be described in detail below, by way of example only, with reference to the accompanying drawings, in which:

FIG. 1 is an upper perspective view showing an upper portion of a vehicle employing an embodiment of a roof structure of the present invention;

FIG. 2 is a top plan view of the embodiment of the roof structure;

FIG. 3 is a bottom plan view of the embodiment of the roof structure of the present invention;

FIG. 5 is a vertical sectional view taken along line 5-5 of FIG. 2, which particularly shows the straight portion 31e;

FIG. 6 is a vertical sectional view taken along line 6-6 of FIG. 2;

FIG. 7 is a vertical sectional view taken along line 7-7 of FIG. 2;

FIG. 8 is a bottom plan view showing the reverse surface of a sunroof in the embodiment of the roof structure.

DETAILED DESCRIPTION OF THE PREFERRED EMBODIMENT

Figure 4:
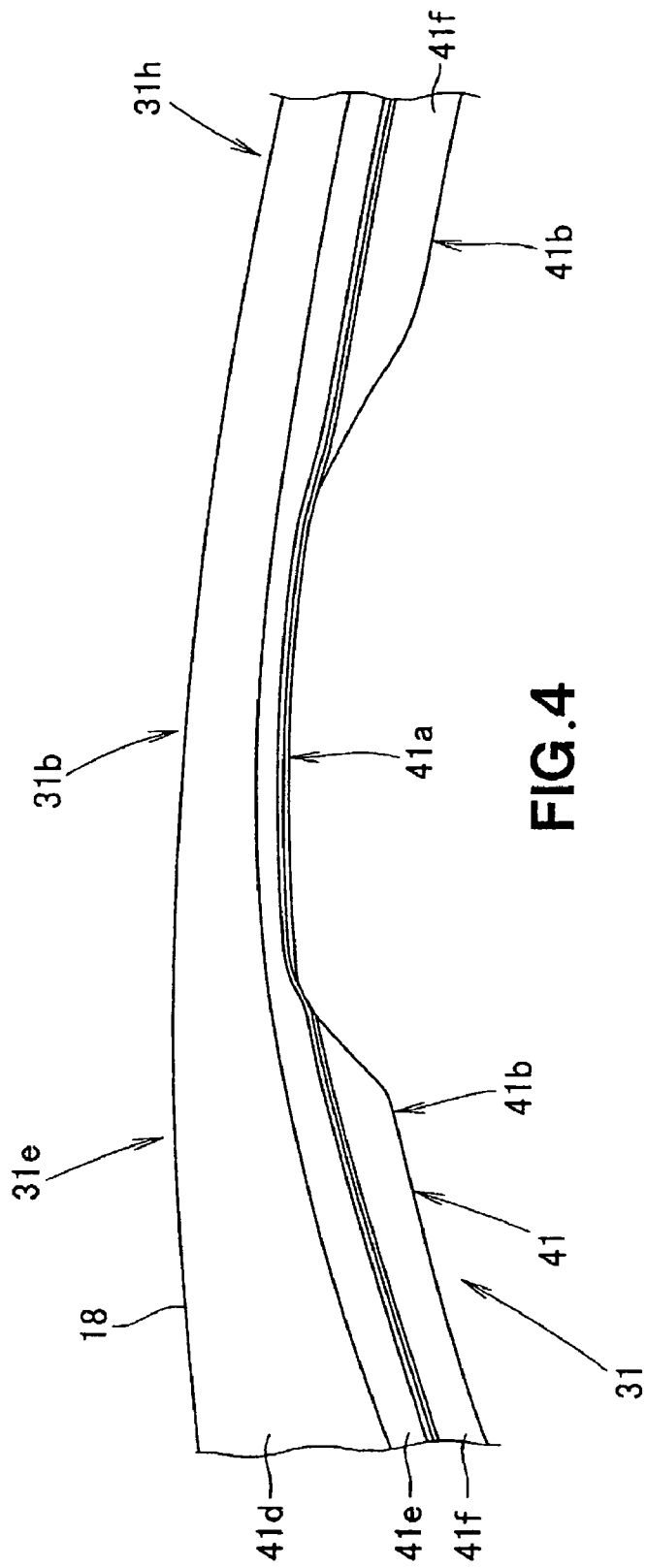
FIG. 4 is a view showing a corner portion of an opening formed in a roof panel in the embodiment of the roof structure.
Figure 9:
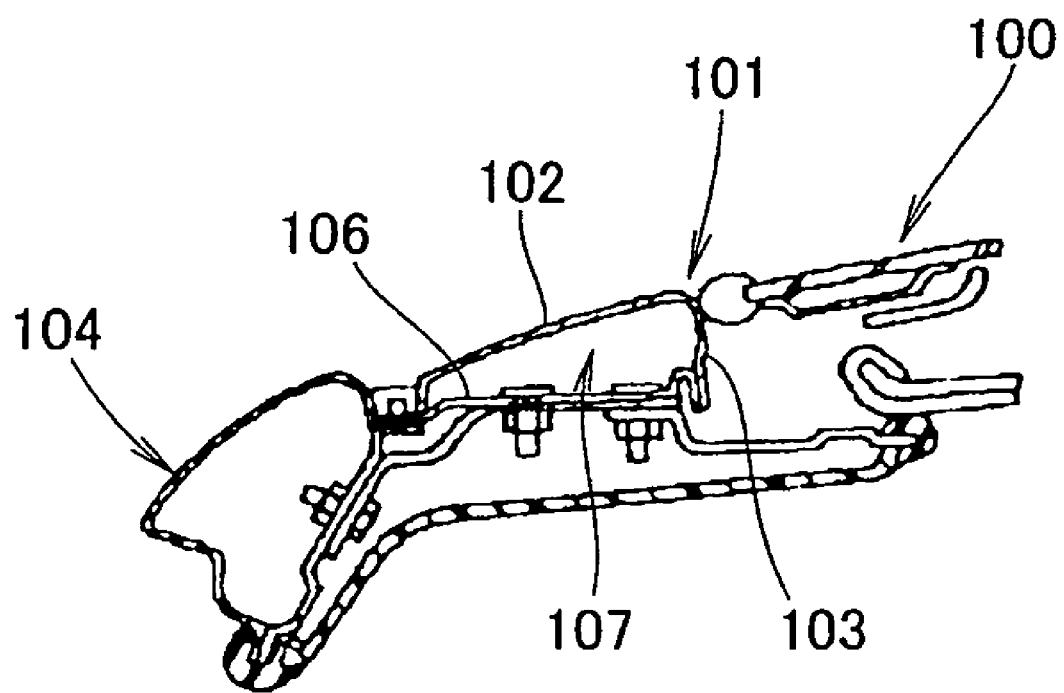
FIG. 9 is a vertical sectional view showing a conventionally-known vehicular roof structure.

Reference is now made to FIG. 1 showing in perspective an upper portion of a vehicle employing an embodiment of a roof structure of the present invention. The vehicle 10 is a four-wheeled vehicle that is capable of opening the interior of a vehicle compartment by provision of an openable/closeable sunroof 12 in a front section of a roof 11 above front seats.

The roof 11 is mounted on rails (track members) 15 fixed to upper end portions of left and right side bodies 14. Reference numeral 17 indicates a lid of the sunroof 12, 18 a roof panel of the roof 11, 21 a windshield, 22 a front door, and 23 a rear door. Designated by 24 is a front pillar.

FIG. 2 is a top plan view of the roof structure, where arrow "FRONT" indicates a forward direction of the vehicle. Substantially rectangular opening 31 elongated in a width (or left-right) direction of the vehicle is provided in a front region of the roof 11 (more specifically, a front region of the roof panel 18) having an outer surface 18a. The sunroof opening 31 has four arcuately curved corner portions 31a-31d and four straight or substantially straight portions 31e-31h defined by inner edge portions of by the roof panel 18.

FIG. 3 is a bottom plan view of the embodiment of the roof structure of the present invention, which particularly shows a panel-shaped reinforcing stiffener 35 provided on the inner or reverse surface 18b of the roof panel 18. The stiffener 35 has an opening 36 formed into generally the same size as the sun roof opening 31 formed in the roof panel 18, a plurality of mounting holes for mounting sunroof component parts, and a plurality of lightening holes for reducing the weight of the stiffener 35.

FIG. 4 is a view showing the front of one of the corner portions (31b in the illustrated example of FIG. 4) of the opening 31 formed in the roof panel 18. The peripheral edge of the opening 31 is defined by a downwardly-bent roof panel flange 41 formed on the inner edge portions of the roof panel 18. At each of the corner portions 31a-31d (only the corner portion 31b is shown in FIG. 4), the downwardly-bent roof panel flange 41 is formed as a small flange 41a having a reduced vertical width with press formability taken into account. Further, at each of the straight portions 31e-31h (only the straight portions 31e and 31h are shown in FIG. 4), the downwardly-bent roof panel flange 41 is formed as a large flange 41b greater in vertical width than the small flange 41a.

FIG. 5 is a vertical sectional view taken along the 5-5 line of FIG. 2, which particularly shows one of the straight portions (31e in the illustrated example). The large flange 41b of the roof panel 18 has an upper flange portion 41d, a slanting flange portion 41e extending downwardly and outwardly (away from the opening 31) from the lower end of the upper flange portion 41d, and a lower flange portion 41f extending downwardly from the lower end of the slanting flange portion 41e.

Inner edge portion of the stiffener 35, located around the peripheral edge of the opening 31, is bent downward to provide a stiffener flange 35a, and the stiffener flange 35a is formed as a large flange 35c except at a portion thereof corresponding to the above-mentioned corner portion 31b. The large flange 35c is fixedly joined to the lower flange portion 41f of the roof panel 18 by spot welding.

FIG. 6 is a vertical sectional view taken along the 6-6 line of FIG. 2, which particularly shows a portion of the roof 11 located slightly forwardly of the opening 31. As shown, a generally-horizontally-oriented flange 43 is formed on an outer edge portion (as viewed in the width direction of the vehicle) of the roof panel 18, and the stiffener 35 has an ear portion 45 formed on an outer edge thereof and extending outwardly in the width direction of the vehicle. These horizontally-oriented flange 43 and the ear portion 45 are fixedly joined with each other by spot welding, to provide a flange-ear joint section 46.

Such a flange-ear joint section 46 comprising the horizontally-oriented flange 43 and ear portion 45 is located on each of the left and right sides of the roof 11; more specifically, the left and right flange-ear joint sections 46 are mounted on the rails 15 fixed to the upper end portions of left and right side bodies 14.

FIG. 7 is a vertical sectional view taken along the 7-7 line of FIG. 2, which particularly shows the small flange 41a of the roof panel 18 that has the upper flange portion 41d and slanting flange portion 41e.

At the corner portion (31b in the illustrated example), the flange 35a of the stiffener 35 is constructed as a small flange 35d having a smaller vertical width than the large flange 35c with press formability taken into account. Projecting portion 35f is formed integrally with the small flange 35d and projects upwardly from the small flange 35d to the roof panel 18, and a flat portion 35g is formed integrally with the projecting portion 35f and extending outwardly from the projecting portion 35f.

The projecting portion 35f is kept in abutment against the reverse surface 18b of the roof panel 18, and a gap 50 having a vertical width d is formed between the flat portion 35g and the reverse surface 18b. Adhesive 51 is filled in the gap 50 so that the flat portion 35g and part of the projecting portion 35f are fixedly adhered to the reverse surface 18b.

FIG. 8 is a bottom view showing the reverse surface of the sunroof of the present invention, which particularly shows regions corresponding to the projecting portions 35f and adhesive-applied regions where the adhesive 51 is applied to the stiffener 35. In FIG. 8, the regions corresponding to the projecting portions 35f are each depicted as a black arcuate belt, while the adhesive-applied regions are each depicted as a cross-hatched arcuate belt.

Namely, the projecting portion 35f is provided on each of the corner portions 31a and 31b of the sunroof opening 31, and portions of the roof panel 18 and the stiffener 35 located near the projecting portion 35f are adhered to each other by the adhesive 51. Further, portions of the roof panel and the stiffener 35 located near the rear corner portions 31c and 31d and straight portion 31f of the opening 31 are adhered to each other by the adhesive 51.

By the adhesion near the projecting portions 35f, it is possible to increase the strength and rigidity of the corner portions 31a and 31b.

Because the sunroof glass (i.e., lid 17 shown in FIG. 1) is constructed to move back and forth, the flanges 41d (see FIG. 7) of the roof panel 18 located in the rear corner portions of the opening 31 can not have a great vertical width, and thus the roof panel 18 and the stiffener 35 are joined to each other by the adhesive 51 with no projecting portion 35f provided.

According the above-described embodiment of the vehicular roof structure 10, as shown in FIGS. 1, 2, 5 and 7, the roof panel 18 has the opening 31 for mounting therein the sunroof 12, the downwardly-bent roof panel flange 41 is formed the roof panel 18 along the inner peripheral edge of the opening 31, and the flange 35a of the stiffener 35, disposed inwardly of the roof panel 18, is welded to the reverse surface 18b of the downwardly-bent roof panel flange 41 except at portions thereof corresponding to the corner portions 31a-31d of the peripheral edge of the opening 31. Further, the projecting portions 35 projecting upward to the reverse surface 18b of the roof panel 18 are provided on portions of the stiffener 35 located at the corner portions 31a-31d of the peripheral edge of the opening 31, and each of the projecting portions 35 is abutted against the reverse surface 18b of the roof panel 18 with the gap 51 of the vertical width d formed between the reverse surface 18b of the roof panel 18 and a region of the stiffener 35 around the projecting portions 35 (more specifically, the flat portion 35g), and the adhesive 51 is inserted into the gap 51 to fixedly adhere together the roof panel 18 and the stiffener 35. By abutting the projecting portions 35 against the reverse surface 18b of the roof panel 18 and fixedly adhering together the roof panel 18 and the stiffener 35 in the aforementioned manner, the corner portions 31a-31d of the opening 31 can be reinforced, while the other portions than the corner portions 31a-31d, i.e. the straight portions 31e-31h, of the opening 31 can be reinforced by the welding joint between the downwardly-bent roof panel flange 41 of the roof panel 18 and the flange 35a of the stiffener 35. As a result, it is possible to significantly increase the strength and rigidity of the peripheral edge of the opening 31, including the corner portions 31a-31d, without providing any additional component parts.

Further, even when the adhesive 51 contracts due to curing of the adhesive 51, the high rigidity of the projecting portions 35 can prevent the outer surface 18a of the roof panel 18 from being pulled inward to form a depression.

The vehicular roof structure of the present invention is well suited for application to four-wheeled vehicles.

Obviously, various minor changes and modifications of the present invention are possible in light of the above teaching. It is therefore to be understood that within the scope of the appended claims the invention may be practiced otherwise than as specifically described.

What is claimed is:

1. A roof structure for a vehicle, comprising:
   a roof panel having an opening formed therein for mounting therein a sunroof, the roof panel having a downwardly-bent roof panel flange formed on an inner edge portion thereof around a peripheral edge of the opening; and
   a stiffener disposed inwardly of the roof panel and having a stiffener flange welded to a reverse surface of the downwardly-bent roof panel flange the stiffener flange being truncated and separated from the downwardly-bent roof panel flange, the stiffener flange being truncated and separated from the downwardly-bent roof panel flange at portions thereof corresponding to corner portions of the peripheral edge of the opening,
   wherein, at each of the portions corresponding to the corner portions of the peripheral edge of the opening, the stiffener has an upwardly-oriented projecting portion projecting from the stiffener flange into abutment against the reverse surface of the roof panel such that a predetermined gap is formed between the reverse surface of the roof panel and a region of the stiffener around the projecting portion, and the roof panel and the stiffener are fixedly adhered together via an adhesive inserted into the gap.

2. The vehicular roof structure of claim 1, wherein the projecting portions are provided on those portions of the stiffener which correspond to the corner portions of the opening peripheral edge located closely to front pillars of the vehicle.

3. The vehicular roof structure of claim 1 or 2, wherein the projecting portions are provided in a vicinity of the roof panel flange.

4. The vehicular roof structure of claim 1 or 2, wherein the projecting portions are formed together with the stiffener flange.

5. The vehicular roof structure of claim 1 wherein lower portions of the roof panel flange are slantingly bent at corner portions.

* * * * *